M. STEPHENS.
Rotary Shears for Metals.
No. 144,155.  Patented Oct. 28, 1873.
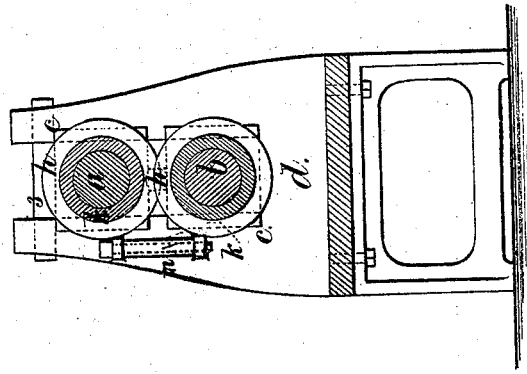
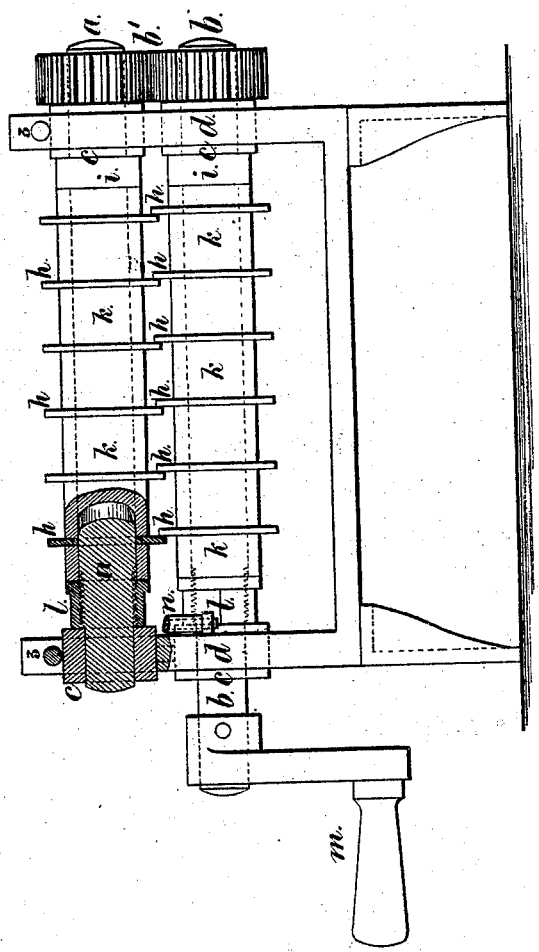

UNITED STATES PATENT OFFICE.

MELVIN STEPHENS, OF BROOKLYN, NEW YORK.

IMPROVEMENT IN ROTARY SHEARS FOR METAL.

Specification forming part of Letters Patent No. 144,155, dated October 28, 1873; application filed September 9, 1873.

*To all whom it may concern:*

Be it known that I, MELVIN STEPHENS, of Brooklyn, in the county of Kings and State of New York, have invented an Improvement in Rotary Shears for Metal, of which the following is a correct specification:

This machine is especially adapted to cutting up sheet metal into strips, such as required for the manufacture of sheet-metal tubes for stove-pipes, cement-lined pipes, speaking-tubes, &c., but the shears may also be used for cutting sheet metal into bands or strips for hoops, &c.

Rollers have heretofore been made for accomplishing the aforesaid object, in which the projecting ribs of one roller are of a size to fill the groove of the other roller, the respective grooves and ribs being rectangular in section, but in shears of this character there is no way of keeping the cutting-edges sharp and in contact and compensating wear. Besides this the entire roller has to be adapted to certain widths of strips, and cannot be changed from time to time. Furthermore, each strip being forced into a groove is liable to wind around the roller. In other instances the rollers have been made with movable cutting-disks kept in place by adjustable screw-rings, as seen in Letters Patent No. 91,512; but one strip is carried down and the next up, hence the risk of the metal wrapping around the rollers remains.

My invention is made for avoiding all these difficulties; and consists in movable metal disks kept apart by cylindrical washers, and clamped together upon two shafts that are so positioned and sustained that the cutting-edges all operate in the same direction to carry the right edges of the strips down and the left edges up, or vice versa, thereby rendering it impossible for the strip to be carried around the roller, because the strip is not forced down into a groove, but one edge of each strip passes into the groove and the other rests upon the periphery of the cutter. This construction allows the cutting-edges to be forced into contact in one direction, and kept to place even after grinding without varying the width of cut, and the cutters can be changed with facility from time to time to strip up different widths of material, as required.

In the drawing, Figure 1 is an elevation with the rollers in section near one end; and Fig. 2 is a cross-section.

The shafts $a$ $b$ are of suitable size. They are connected by gearing $b'$, and sustained in boxes or bearings $c$ within the frame $d$. These parts should be such as to allow of their being easily removed and replaced. For this purpose the keys or bolts 3 3 are shown as employed for keeping the boxes $c$ in place within the frame $d$, and one of these boxes may be provided with a set-screw or nut to press the cutting-disks toward each other. Caps and adjusting-screws for the boxes $c$ can take the place of the bolts 3. The disks $h$ are of steel with central openings for the shaft $a$ or $b$, and the cylindrical washers $k$ also fit upon said shaft; and these cylindrical washers are of a length to keep the disk-cutters at the proper distance apart, according to the width of strips to be cut. The collars $i$ upon the shafts $a$ $b$ form abutments, against which the respective ranges of cylindrical washers and cutters are clamped by the nuts $l$.

The rollers may be revolved by hand or otherwise.

I have shown a crank at $m$, and a roller at $n$ may be employed as a gage for the edge of the sheet to run against.

It will be apparent that the cutting-edges formed by the respective pairs of disks can be kept together by an end pressure given to either roller-shaft, $a$ or $b$; that the strip will be above one cutting-disk at one edge, and below the next disk at the other edge, hence will deliver freely; and that the disks can be removed and adapted to cutting different widths of material by simply changing the cylindrical washers.

I claim as my invention—

The rotary shears, made of two rollers, each formed with a shaft, cutting-rings, and intermediate cylindrical washers, when the shears are arranged, as set forth, to carry one edge of each strip down and the other edge up, and the cutters are all kept in contact by an end pressure given to one of the rollers, substantially as set forth.

Signed by me this 5th day of September, 1873.

MELVIN STEPHENS.

Witnesses:
HAROLD SERRELL,
CHAS. H. SMITH.